(12) United States Patent
Mordeglia et al.

(10) Patent No.: US 12,244,150 B2
(45) Date of Patent: Mar. 4, 2025

(54) ELECTRIC POWER SUPPLY APPARATUS FOR A HIGH-POWER USER DEVICE

(71) Applicant: DANIELI AUTOMATION S.P.A., Buttrio (IT)

(72) Inventors: Antonello Mordeglia, Bangkok (TH); Roberto Molteni, Tradate (IT)

(73) Assignee: DANIELI AUTOMATION S.P.A., Buttrio (IT)

( * ) Notice: Subject to any disclaimer, the term of this patent is extended or adjusted under 35 U.S.C. 154(b) by 99 days.

(21) Appl. No.: 17/799,919

(22) PCT Filed: Feb. 11, 2021

(86) PCT No.: PCT/IT2021/050032
§ 371 (c)(1),
(2) Date: Aug. 15, 2022

(87) PCT Pub. No.: WO2021/161355
PCT Pub. Date: Aug. 19, 2021

(65) Prior Publication Data
US 2023/0062705 A1  Mar. 2, 2023

(30) Foreign Application Priority Data

Feb. 14, 2020 (IT) .......................... 102020000002959

(51) Int. Cl.
*H02J 3/36* (2006.01)
*H02M 7/757* (2006.01)
(Continued)

(52) U.S. Cl.
CPC .............. *H02J 3/36* (2013.01); *H02M 7/7575* (2013.01); *H02M 7/48* (2013.01); *H02M 7/493* (2013.01)

(58) Field of Classification Search
CPC ...... H02M 5/40–443; H02M 5/45–453; H02M 5/458–4585; H02M 7/48;
(Continued)

(56) References Cited

U.S. PATENT DOCUMENTS 2,740,095 A * 3/1956 Somes .................... H01B 11/18
174/32
3,586,958 A * 6/1971 Kafka ......................... H02J 1/06
363/35
(Continued)

FOREIGN PATENT DOCUMENTS

CN    101458989 A    6/2009
CN    106602566 A    4/2017
(Continued)

OTHER PUBLICATIONS

Hassenzahl et al., "Electric power applications of superconductivity," in Proceedings of the IEEE, vol. 92, No. 10, pp. 1655-1674, Oct. 2004, doi: 10.1109/JPROC.2004.833674. (Year: 2004).*
(Continued)

*Primary Examiner* — Fred E Finch, III
(74) *Attorney, Agent, or Firm* — MARSHALL, GERSTEIN & BORUN LLP

(57) ABSTRACT

An electric power supply apparatus for a user device, in particular for steel industry applications, that includes means for connection to an electricity grid for supplying a mains voltage and a mains current, and at least one electric line for connecting the electricity grid to the user device, wherein the electric line includes one or more electric apparatuses located between the electricity grid and the user device.

16 Claims, 3 Drawing Sheets

(51) Int. Cl.
*H02M 7/48* (2007.01)
*H02M 7/493* (2007.01)

(58) Field of Classification Search
CPC .... H02M 7/493; H02M 7/7575; H01B 12/00; H01B 12/16; F27B 3/085
See application file for complete search history.

(56) References Cited

U.S. PATENT DOCUMENTS

| | | | | |
|---|---|---|---|---|
| 5,272,719 | A * | 12/1993 | Cartlidge | H02M 7/48 373/150 |
| 5,508,497 | A * | 4/1996 | Fabianowski | C21C 5/5229 219/662 |
| 5,543,602 | A * | 8/1996 | Gensini | H02J 3/28 219/486 |
| 5,612,615 | A * | 3/1997 | Gold | H02M 3/155 363/141 |
| 6,545,880 | B1 * | 4/2003 | Mueller | H02J 3/00 307/11 |
| 2011/0176575 | A1 * | 7/2011 | Horger | H05B 7/144 373/104 |
| 2016/0141081 | A1 | 5/2016 | Carter et al. | |
| 2018/0166188 | A1 | 6/2018 | Arndt et al. | |
| 2021/0231372 | A1 * | 7/2021 | Gigante | H05B 7/144 |

FOREIGN PATENT DOCUMENTS

| | | |
|---|---|---|
| JP | H01315222 A | 12/1989 |
| JP | H02131327 A | 5/1990 |
| JP | 2001 177996 A | 6/2001 |
| JP | 2003333746 A * | 11/2003 |
| WO | WO-2011/033308 A2 | 3/2011 |
| WO | WO-2019207611 A1 * | 10/2019 ............. F27B 3/085 |

OTHER PUBLICATIONS

McConnell, B., "Applications of high temperature superconductors to direct current electric power transmission and distribution," in IEEE Transactions on Applied Superconductivity, vol. 15, No. 2, pp. 2142-2145, Jun. 2005, doi: 10.1109/TASC.2005.849479. (Year: 2005).*

Sytnikov et al., "HTS DC Cable Line Project: On-Going Activities in Russia," in IEEE Transactions on Applied Superconductivity, vol. 23, No. 3, pp. 5401904-5401904, Jun. 2013, Art No. 5401904, doi: 10.1109/TASC.2013.2245280. (Year: 2013).*

Yakimov et al., "The Energy-Efficient Control of the Electrical Regime of High-Power Electric Arc Furnaces: The Case of EAF-180 MMK, PJSC," 2018 International Conference on Industrial Engineering, Applications and Manufacturing, Moscow, Russia, 2018, pp. 1-5, doi: 10.1109/ICIEAM.2018.8728668. (Year: 2018).*

H. N. Cox et al., "Electric power systems for steel plants," in Transactions of the American Institute of Electrical Engineers, Part II: Applications and Industry, vol. 75, No. 6, pp. 339-349, Jan. 1957, doi: 10.1109/TAI.1957.6367256. Obtained on Feb. 16, 2024. (Year: 1957).*

Zhao et al., "Advantage of HTS DC power transmission," Applied Superconductivity and Electromagnetic Devices, IEEE, pp. 403-406, 2009.

International Search Report and Written Opinion for PCT/IT2021/050032, mailed May 10, 2021.

* cited by examiner

ELECTRIC POWER SUPPLY APPARATUS FOR A HIGH-POWER USER DEVICE

FIELD OF THE INVENTION

The present invention concerns an electric power supply apparatus for a user device, in particular an electric furnace for steel applications for the production of steel, or also in the sector of processing other metals, or glass materials, or in general for applications needing to power high-power loads, for example in the order of 30-40 MW and more.

The electric power supply apparatus according to the invention allows in particular to transport the electrical energy supplied by an electricity grid to the user device through electric power lines, reducing load losses to a minimum.

An electric power line for the user device will comprise one or more electric apparatuses in series and/or in parallel between the user device and the electricity grid.

The term electric apparatuses means, here and hereafter in the description, electric machines able to transform or convert voltage and current, but also electric and/or electronic devices, such as inductors, rectifiers, converters, inverters or other.

The user device, applied in particular to the steel industry, but not only, can be any device whatsoever that requires a high level of electric power, for example a melting furnace, a heating furnace or other, for example an electric arc furnace, preferably powered by alternating current, an induction furnace, ladle furnaces, or other.

BACKGROUND OF THE INVENTION

As is known, steel applications exist in which a user device, for example one of the furnaces mentioned above, requires an efficient electric power supply system, which normally requires high power and also high currents.

This electric power supply system therefore normally provides an energy source, that is, the electricity grid, which is connected to the user device by means of a power supply line along which a series of electric apparatuses are provided, that is, the power supply line provides a series of intermediate segments that connect the electric apparatuses to each other between the electricity grid and the user device.

Currently, known connections between the energy source, the user device and the intermediate segments are made of conductive materials; in particular, most of the connecting lines are made of copper, aluminum or other metal alloys.

For transporting high currents, it is known to use high section cables, as these sections are sized according to known laws in electric engineering systems. Such cables can therefore reach sections with diameters of up to 200-400 mm each, connected together in parallel so that they are able to transport thousands of amperes, with a consequent increase in costs, weights and losses from the point of view of efficiency in energy transmission.

It is also known that the convenience of transporting electrical energy increases as the voltage increases. The loss of energy in an electric transport line is mainly due to losses due to the Joule effect, by means of which the electric current flowing in the cables produces heat. Since the power transferred by the line is equal to the product of voltage by current, it is understood that, given the same power, it is sufficient to increase the voltage to reduce the current and therefore the losses. The transport of energy is generally done in alternating current (AC), except in specific situations or applications where very high direct current voltages (DC) and consequent low direct currents are used, which allow to considerably reduce the losses due to the Joule effect.

However, the use of high voltages to prevent losses during the transport of energy has limits, mainly due to the problem of cable insulation and the intrinsic safety of the system in the event of breakdown.

For example, if the user device is an electric arc furnace powered by alternating current, the electric furnace is typically powered by a high voltage line through an HV/MV (High voltage/Medium voltage) transformer, therefore with voltages of the transformer secondary which can vary from 10 kV to 30 kV.

Furthermore, in alternating current systems the capacitance and inductance linked to the size of the conductors, as well as the interactions of the electromagnetic fields generated, also become relevant. These phenomena cause further losses due to the Joule effect, which therefore do not contribute to supplying active power to the user load.

In the power lines of electric furnaces, or in any case of user devices that require high operating currents, it is common to connect the electricity grid to its own HV/MV transformation substation, which can be a few hundred meters away from the final user device.

Normally the substation is then connected, by means of an additional MV/MV (Medium Voltage/Medium Voltage) step-down transformer, to the power supply devices of the user device, for example a melting furnace; these power supply devices are typically a few dozen meters from the user device, so as to be able to supply the high currents while trying to contain the losses described above.

However, the need to provide this short distance between the energy sources, that is, the electricity grid and/or the substations or intermediate electric apparatuses, the power supply devices and the user device, often turns out to be a very stringent constraint, which risks being an obstacle in the event that changes or restructuring need to be made to existing lines and plants.

In particular, this limitation can be a problem, for example if it is desired or necessary to increase the distance between the energy source and the user device, or even if it is desired to separate the electric power supply system of a melting furnace from the steel plant in which the furnace itself is positioned, locating said electric power supply system and said melting furnace for example in two separate and relatively distant buildings.

Document CN101458989A describes a transformer for an electric arc furnace or an induction furnace. Document CN106602566A describes a power supply system connected to a renewable energy source comprising an alternating current power supply subsystem for powering a load with direct current. JPH01315222A describes a network protector used in an electric power supply system. US2016/0141081A1 describes a combined infrastructure of electric power supply and hydrogen energy.

One purpose of the present invention is therefore to provide an electric power supply apparatus for steel applications which allows to connect one or more user devices, even those with high energy absorption, to at least one source of electrical energy in an efficient, economical way, and which limits the normal losses due to the transport of electrical energy on a power supply line, for example losses due to the Joule effect.

Another purpose of the present invention is to provide an electric power supply apparatus for steel applications which is substantially free of constraints relating to the distance between the various components, that is, which provides an effective transmission system for electrical energy, allowing, if necessary and in an effective manner, to provide a distancing between the components of the electric power supply apparatus that can be extremely variable and flexible, for example due to the need to expand a steel plant, install new components, or other.

Another purpose of the present invention is to provide an electric power supply apparatus which is efficient and at the same time scalable and versatile and can be easily adapted to different applications in terms of load and power supply required.

The Applicant has devised, tested and embodied the present invention to overcome the shortcomings of the state of the art and to obtain these and other purposes and advantages.

SUMMARY OF THE INVENTION

The present invention is set forth and characterized in the independent claim. The dependent claims describe other characteristics of the present invention or variants to the main inventive idea.

In accordance with the above purposes, an electric power supply apparatus for a user device, in particular for steel industry applications, or for glass or metal processing applications, according to the present invention comprises means for connection to an electricity grid for supplying a mains voltage and a mains current, and at least one electric line for the connection between the connection means and the user device, wherein the electric line comprises a power supply system able to power the user device, connected between the connection means and the user device.

In particular, the electricity grid can be a grid that supplies high voltage electrical energy. Preferably, the electricity grid is an electricity grid of the three-phase type that supplies a mains voltage and a mains current in alternating current.

The power supply system comprises at least one power supply module comprising at least one transformer provided with at least one transformer primary connected to at least one transformer secondary, at least one rectifier connected to the transformer secondary, and at least one converter connected to the at least one rectifier located upstream of the user device.

The at least one rectifier and the at least one converter are connected by means of at least one intermediate connection circuit in direct current, also called DC link.

According to one characteristic aspect of the invention, the intermediate connection circuit comprises at least one segment of line made with at least one superconductor cable.

In particular, the intermediate circuit in direct current separates from each other a first part of the power supply system, configured to transform the electrical energy in alternating current supplied by the electricity grid into electrical energy in direct current with the desired voltage and current values, and a second part of the power supply system configured to transform the electrical energy in direct current into electrical energy in alternating current and regulate the value and frequency of the voltage and current supplied to the user device.

Advantageously, by using one or more superconductor cables to manufacture one or more of the segments of electric line, it is possible to produce an electric power supply apparatus, in particular for steel industry applications, which allows to connect at least one user device, even with high energy absorption, to at least one electricity grid in an efficient, economical manner that limits the normal losses caused by transporting electrical energy on a power supply line, for example losses due to the Joule effect.

Thanks to the use of a superconductor cable to manufacture at least part of the intermediate connection circuit, it is possible to separate and distance the first part and the second part of the power supply system from each other, for example by between a few tens to a few hundred meters, or by even a few kilometers, with negligible losses.

The present electric power supply apparatus is therefore substantially free of constraints relating to the distance between the electricity grid and the user device, or also between the various components, and electrical apparatuses, that is, it allows, where necessary and in an effective manner, to provide a distancing between the components of the electric power supply apparatus that is extremely variable and flexible, for example due to the need to expand a steel plant, install new components, or other.

In some embodiments, the user device can be an electric furnace, for example an electric arc furnace, powered in alternating current.

Thanks to the use of a superconductor cable to manufacture at least part of the intermediate connection circuit, it is possible to separate and distance the first part and the second part of the power supply system from each other, for example by between a few tens to a few hundred meters.

In some embodiments, the power supply system can comprise a plurality of power supply modules, each comprising at least one transformer with respective transformer primary and transformer secondary, a rectifier connected to the transformer secondary, an intermediate circuit in direct current and a converter.

Preferably, each power supply module comprises a transformer secondary, a rectifier and a converter for each phase of the power supply grid.

The rectifiers and the converters of each power supply module can share the same intermediate circuit.

According to further embodiments, the first part of the power supply system, that is, a first part of each power supply module, can be positioned inside a first building and the second part of the power supply system, that is, a second part of each power supply module, can be positioned inside a second building, wherein these parts of each power supply module are connected by means of one or more segments of line made with at least one superconductor cable.

Advantageously, since the segments of line that connect the first and second parts of the module(s) are in direct current and are made with superconductor cables, the power supply system has practically zero losses between the electricity grid and the user device.

This is also due to the fact that the superconductor cables are particularly efficient in carrying direct electric current.

In this way, it is possible to separate from each other and distance the components of the power supply modules even by tens of meters, without problems of voltage and current losses due to the Joule effect, thus allowing a very versatile management of the spaces available.

Here and hereafter in the description, by "superconductor cable" we mean an electric cable made with semi-ceramic, or ceramic, materials defined as HTS (High Temperature Superconductivity), or metallic materials, defined as LTS (Low Temperature Superconductivity). These materials, if taken to a critical temperature, specific for each one of them, have the characteristic of having substantially zero resistance to the passage of current. In particular, the superconductor cables in question are cables defined as such according to the ceramic-based, or metal-based, or salt-based BCS (Bardeen-Cooper-Schrieffer) theory of superconductivity.

According to some embodiments, there can be provided an inductor connected downstream of the, or of each, converter and upstream of the user device.

According to possible embodiments, the electric line can comprise at least a first high voltage/medium voltage transformer located downstream of the means for connection to the electricity grid and connected to the at least one transformer of the power supply system.

According to some embodiments, the power supply system can be connected to the transformer and/or to the electric arc furnace by means of at least one segment of line made with at least one superconductor cable.

According to some embodiments, the transformer secondary and the rectifier can be connected by means of at least one segment of line made with at least one superconductor cable.

According to further embodiments, the converter and the electric furnace are connected by means of one or more segments of line passing through the inductor and made with at least one superconductor cable.

According to other embodiments, all the segments of line of the power supply system are made with superconductor cables.

BRIEF DESCRIPTION OF THE DRAWINGS

These and other aspects, characteristics and advantages of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the possible embodiments of the invention, of which one or more examples are shown in the attached drawings. Each example is supplied by way of illustration of the invention and shall not be understood as a limitation thereof. For example, one or more characteristics shown or described insomuch as they are part of one embodiment can be varied or adopted on, or in association with, other embodiments to produce another embodiment. It is understood that the present invention shall include all such modifications and variants.

Figure 1:
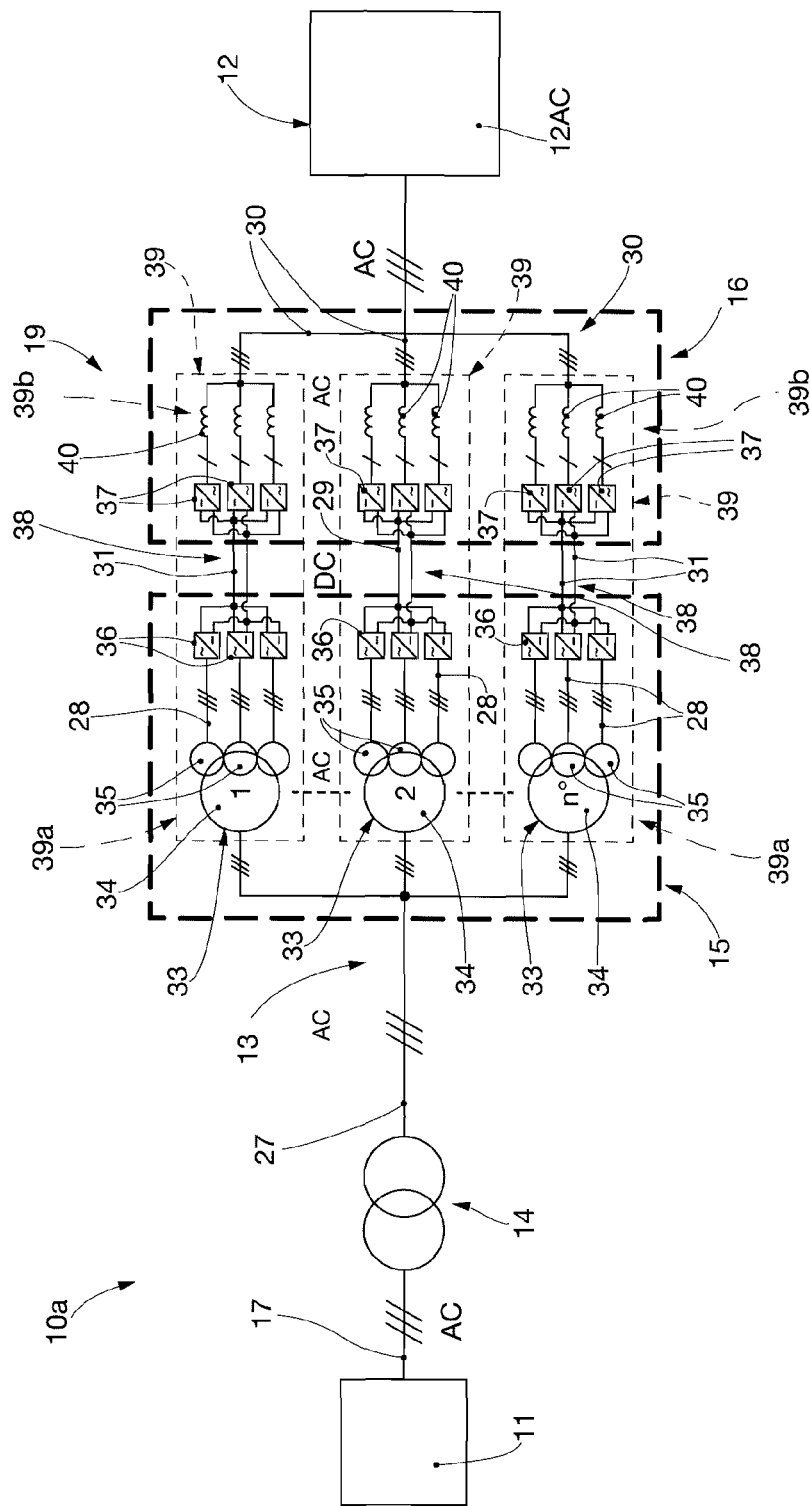
FIG. 1 is a schematic illustration of an electric apparatus for steel industry applications according to a first embodiment of the invention.

With reference to the attached drawings, see for example FIG. 1, an electric power supply apparatus 10a, for a user device 12, for example an electric arc furnace for steel industry applications, or for the glass or metal processing sector, according to the present invention comprises means for connection to an electricity grid 11 and at least one electric line 13 for the connection of the electricity grid 11 to the electric arc furnace 12, wherein the electric line 13 comprises one or more electric apparatuses located between the electricity grid 11 and the electric arc furnace 12.

The electric line 13 can be provided with means for connection to the electricity grid 11 and to the user device 12.

According to some embodiments, the user device 12 can be an electric arc furnace of the type powered with alternating current 12AC.

The electricity grid 11 can be, for example, an electricity grid which supplies high voltage electrical energy, in particular in alternating current, having predefined mains voltage, current and frequency values.

The user device 12 could also be, instead of an electric arc furnace 12 powered with alternating current, a different type of melting or heating furnace, such as an induction furnace, a ladle furnace or other.

The apparatus 10a can comprise a first transformer 14, located downstream of the electricity grid 11, for example a high voltage/medium voltage (HV/MV) transformer configured to transform high voltage energy into medium voltage energy, which can be connected to the electricity grid 11 by means of a conductor 17 of the traditional type.

The electric apparatus 10a also comprises a power supply system 19 in alternating current that powers the electric arc furnace 12, which can be connected to the first transformer 14 by means of a segment of line 27, on which there are an alternating mains voltage and mains current.

According to some variants, the power supply system 19 can be connected directly to the electricity grid 11 by the connection means.

The power supply system 19 can comprise a first part 15 configured to transform the mains current and voltage from alternating current into direct current, and a second part 16 configured to transform the current and voltage from direct current into alternating current to be supplied to the electric furnace 12, the two parts being connected to each other by means of an intermediate circuit 38 which works in direct current and which can be manufactured at least in part with one or more superconductor cables.

This allows the electrical energy to be transferred from the first part 15 to the second part 16 of the power supply system 19 substantially without losses, and it is therefore possible to separate the first part 15 and the second part 16 from each other as a function of the construction or logistical needs of the plant, distancing them even by hundreds of meters or a few kilometers.

The power supply system 19 can comprise at least one transformer 33 connected to the segment of line 27 for supplying mains voltage and alternating current, and configured to transform the supply mains voltage and alternating current into a base voltage and alternating current According to some embodiments, the electricity grid 11 can be three-phase. The mains voltage and the mains current have a predefined mains frequency. The mains frequency is a value chosen between 50 Hz and 60 Hz, that is, based on the frequency of the electricity grid of the country where the electric furnace 12 is installed.

The transformer 33 can comprise a transformer primary 34 magnetically coupled to at least one transformer secondary 35.

The transformer 33 can comprise a plurality of transformer secondaries 35 magnetically coupled to the transformer primary 34.

The solution of providing various transformer secondaries 35 allows to reduce the impact of disturbances grid-side, or to reduce the harmonic content and reactive power exchanged on the grid by the combination of the transformer 33 and the rectifier 36.

According to some embodiments, a transformer secondary 35 is provided for each phase of the electricity grid 11.

The base voltage and current supplied by the transformer 33 have a base voltage, a base current, and a base frequency, which are predefined and set by the design characteristics of the transformer 33 itself.

In particular, the base frequency is substantially equal to the mains frequency identified above.

The base voltage and the base current, on the other hand, are correlated respectively to the mains voltage and to the mains current by the transformation ratio of the transformer 33 itself.

The transformer 33, which for example can be of the multi-tap type, can be provided with adjustment devices, not shown, provided to selectively adjust the electrical transformation ratio of the transformer 33 in relation to specific requirements.

The power supply system 19 also comprises at least one rectifier 36 disposed downstream of the transformer 33 along the electric line 13a, in particular connected to the transformer secondary 35.

According to some embodiments, for example described with reference to FIGS. 3 and 4, the power supply system 19 can comprise a plurality of rectifiers 36 connected to the transformer 33 and configured to transform the base voltage and base alternating current into direct voltage and current.

A rectifier 36 is preferably provided connected downstream of each transformer secondary 35.

Specifically, the rectifiers 36 allow to rectify the base voltage and the base alternating current, into respective direct voltages and currents.

The rectifiers 36 can be selected from a group comprising a diode bridge and a thyristor bridge.

In accordance with a possible solution, the rectifiers 36 comprise devices, for example chosen from a group comprising Diodes, SCR (Silicon Controlled Rectifier), GTO (Gate Turn-Off thyristor), IGCT (Integrated Gate-Commutated Thyristor), MCT (Metal-Oxide Semiconductor Controlled Thyristor), BJT (Bipolar Junction Transistor), MOSFET (Metal-Oxide Semiconductor Field-Effect Transistor), IGBT (Insulated-Gate Bipolar Transistor) and SiC (Silicon Carbide Device).

The one or more transformer secondaries 35 can be connected to the corresponding rectifier 36 by means of a segment of line 28 made with at least one superconductor cable.

The power supply system 19 can comprise a plurality of converters 37 connected to the rectifiers 36 and configured to convert the direct voltage and current into a voltage and alternating current for powering the electrodes of the electric arc furnace 12.

Preferably, a converter 36 is provided connected downstream of each rectifier 35.

The converters 37 can comprise devices, for example chosen from a group comprising SCR (Silicon Controlled Rectifier), GTO (Gate Turn-Off thyristor), IGCT (Integrated Gate-Commutated Thyristor), MCT (Metal-Oxide Semiconductor Controlled Thyristor), BJT (Bipolar Junction Transistor), MOSFET (Metal-Oxide Semiconductor Field-Effect Transistor), IGBT (Insulated-Gate Bipolar Transistor) and SiC (Silicon Carbide Device).

In accordance with possible solutions, the one or each rectifier 36 is connected to a converter 37 by means of at least one intermediate circuit 38 which works in direct current.

The one or more transformers 33 and the one or more rectifiers 36 are comprised in the first part 15 of the power supply system 19, while the one or more rectifiers 36 are comprised in the second part 16 of the power supply system 19.

The intermediate circuit 38 is configured to store direct electrical energy and to generate a separation between the second part 16 and the first part 15 of the power supply system 19, and in particular, in the example case, between the electrodes of the electric arc furnace 12 and the rectifiers 36, and therefore with the electricity grid 11.

In particular, the rapid power fluctuations resulting from the metal melting process are partly filtered through the intermediate circuit 38, reducing the impact on the electricity grid 11 side.

This intermediate circuit 38 comprises one or more segments of line 31 which are made with at least one superconductor cable.

Thanks to the use of one or more of such segments of line 31 made with at least one or more superconductor cables, it is possible to increase the distances between the means for connection to the electricity grid 11 and the electric arc furnace 12, which are generally comprised between a few meters and about 20-40 m in traditional plants, according to different needs of the plant, for example expansion, addition or separation of components or parts, or other.

These superconductor cables are characterized by having much smaller section sizes, as well as practically zero losses in direct current DC and extremely low losses in alternating current AC, compared to conductor cables normally used in the sector.

For example, such superconductor cables can be at least partly made of Magnesium Diboride, or other alloys developed to achieve the super conduction. The cross-sections of superconductor cables are very small compared to the sections of copper conductor cables used in the sector; therefore, for the same section, a superconductor cable transfers much more current than a traditional cable.

For example, in the sizing of power cables, these go from a capacity of about 1.5 $A/mm^2$ for copper to about 1000 $A/mm^2$ for direct current DC superconductor cables.

Preferably, the segments of line 31 made with one or more superconductor cables are forcibly cooled down to temperatures of 20-30 k (−240° C.). This in fact takes the resistance of the segment of line 31 to negligible values, even to practically zero in direct current DC, allowing a favored passage of enormous quantities of electrons and therefore the transfer of high quantities of current.

This cooling can be carried out, for example, by means of a coaxial coating of the segments of line 31 which refrigerant fluids travel through, such as for example liquid gases such as nitrogen or helium, which can be made with another simple or corrugated pipe made of steel.

The superconductor cables which these segments of line 31 are made of can also be more or less rigid, so as to allow straight or curved underground installations.

If there is a rectifier 36 and a converter 37 for each phase of the grid, all the rectifiers 36 and the converters 37 can share the same intermediate circuit 38 made with superconductor cables.

Figure 2:
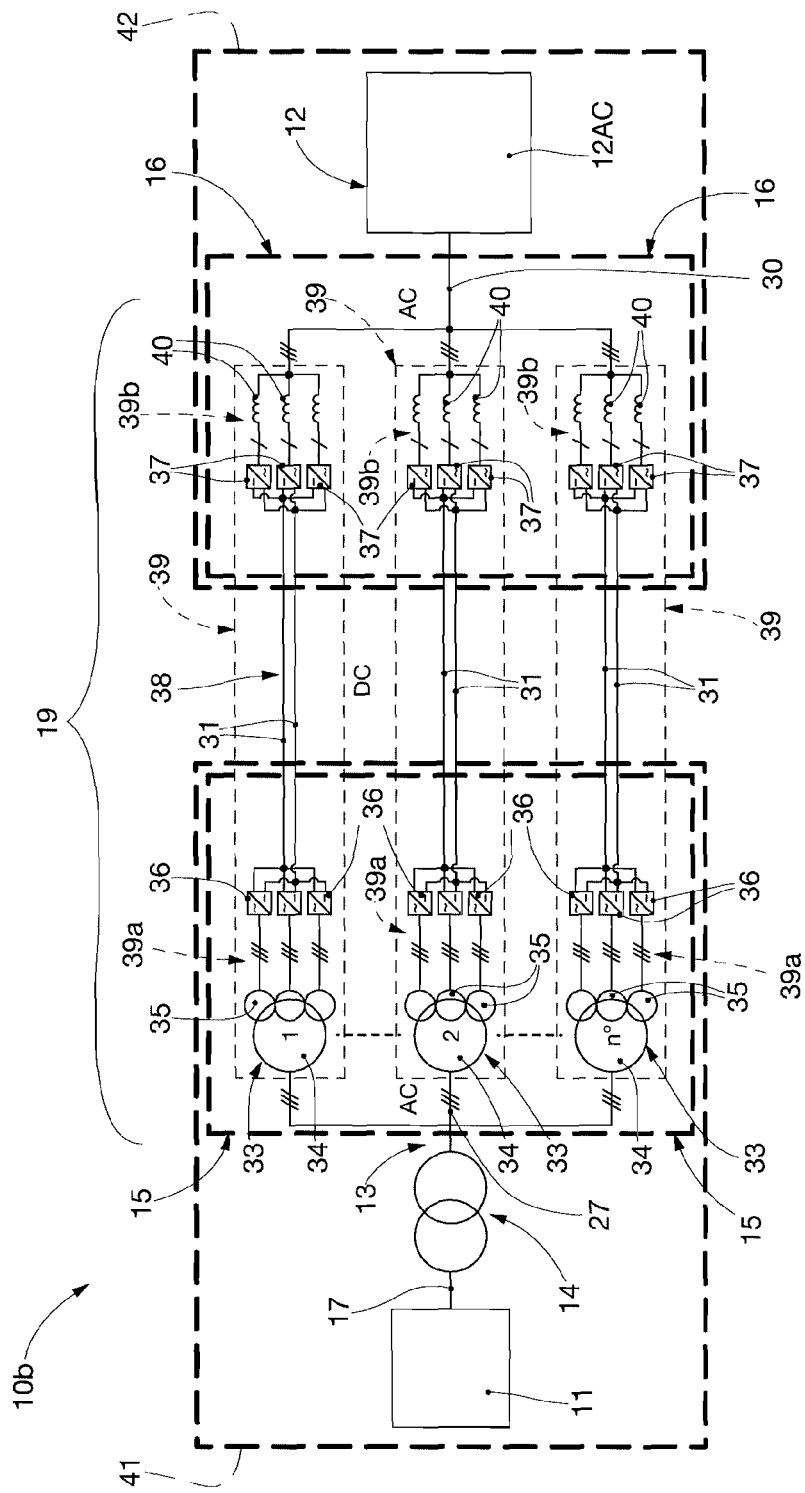
FIG. 2 is a schematic illustration of an electric apparatus for steel industry applications in accordance with a second embodiment of the invention.
Figure 3:
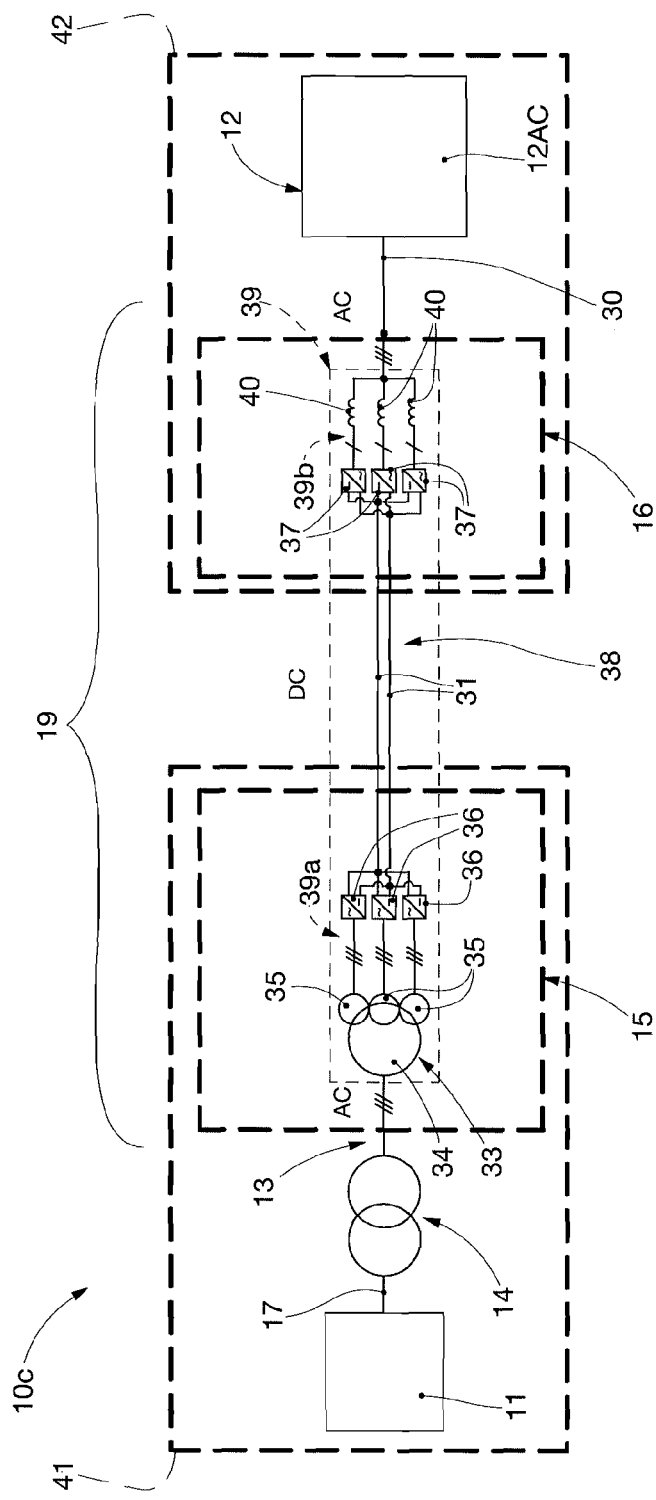
FIG. 3 is a schematic illustration of an electric apparatus for steel industry applications according to a third embodiment of the invention.

In the power supply system 19 shown in FIGS. 1-3, each of the units comprising the transformer 33 with one or more rectifiers 36 and one or more converters 37 as a whole defines a power supply module 39.

The power supply system 19 can provide between 1 and "n" power supply modules, as a function of usage requirements, or it can be provided with a plurality of power supply modules 39, connected in parallel to each other, to the electricity grid 11 and to the electric arc furnace 12.

In the embodiment shown by way of example in FIG. 3, a single power supply module 39 is shown, while in FIGS. 1 and 2, 3 modules are shown indicated with numbers 1, 2, n, where n can be equal to 3 or greater, for example 10, 12, 24, 40, 48, 60 or intermediate values, or greater than 60.

The combination of several power supply modules 39 allows to obtain a power supply system 19 which can be scaled in size in relation to the specific size of the electric arc furnace 12 to be powered.

Downstream of each of the converters 37, there can also be provided an inductor 40, which contributes to the overall reactance of the power supply system 19.

The segments of line 30 located downstream of the converters 37 and upstream of the electric arc furnace 12 can be at least partly made with at least one superconductor cable.

According to some embodiments, the segment of line 27 that connects the high voltage/medium voltage transformers 14 and the medium voltage/medium voltage transformers 33 to each other can also be made with at least one superconductor cable.

Thanks to the use of superconductor cables, the segment of line 27 can be made according to any length whatsoever, from a few and up to one or more kilometers. Currently, in the electric apparatuses for powering electric arc furnaces, this segment of line 27 is of the order of a few tens or a hundred meters.

The segment of line 30 that connects each converter 37 to the electric furnace 12, the length of which is currently equal to about 30 m, can also be made with a considerably greater length, thanks to the use of one or more superconductor cables, even of one or more kilometers.

In the example of an electric apparatus 10b, 10c of FIGS. 2 and 3, the power supply system 19 is substantially divided into two separate buildings 41 and 42, for example the building 41 can be an electric substation while the building 42 can be the steel plant.

In particular, a first part 15 of the power supply system 19 configured to transform the mains current and voltage from alternating current into direct current can be disposed in the first building 41, while a second part 16 of the power supply system 19 configured to transform the current and voltage from direct current into alternating current to be supplied to the electric furnace 12 can be disposed in the second building 42, possibly together with the electric furnace 12.

The first part 15 and the second part 16 are connected to each other by the segments of line 31 in direct current made with one or more superconductor cables.

We have therefore assumed that the one, or each, power supply module 39 of the power supply system 19 is divided into two separate parts, a first part 39a contained in the first building 41 and a second part 39b contained in the second building 42. These parts 39a and 39b are connected by the segments of line 31 made with at least one superconductor cable.

An electric line 13d develops starting from the electricity grid 11, the electrical continuity of which is guaranteed between the rectifiers 36 of the building 41 and the converters of the building 42, by means of the segments of line 31. These segments of line 31 which go from one building to the others are in particular segments of line 31 in direct current that define the intermediate circuit 38, with losses practically equal to zero. These segments of line 31 are made with one or more superconductor cables, therefore the distance between the two buildings 41 and 42 can be chosen at will and can even be of the order of one or more kilometers.

By way of example, we have assumed that the first part 39a positioned in the first building 41 comprises the transformers 33 and the rectifiers 36, while the second part 39b positioned in the second building 42 comprises the converters 37, the inductors 40 and the segments of line 30 which carry the current to the electric arc furnace 12.

These segments of line 30, as seen for the example of FIG. 1, can also be made with one or more superconductor cables.

As previously mentioned, in order to function properly, the superconductor cables of the various segments of line 27, 28, 30, 31 have to be cooled in a very forceful manner.

This can be done using, for example, cryogenic cooling units suitably positioned in the electric apparatus 10a-10c. The cooling mean, for example in the case of superconductors made of Magnesium Diboride, is normally helium.

However, other gases such as oxygen, nitrogen, hydrogen and/or combinations thereof are conceivable as a function of the type of material which the superconductor cables consist of.

Adopting superconductor cables can also be done for applications that require high currents, such as for example induction melting or heating furnaces, or other.

It is clear that modifications and/or additions of parts may be made to the electric apparatus as described heretofore, without departing from the field and scope of the present invention.

It is also clear that, although the present invention has been described with reference to some specific examples, a person of skill in the art shall certainly be able to achieve many other equivalent forms of electric apparatus, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. An electric power supply apparatus for an electric furnace for steel industry applications, comprising:
   means for connection to an electricity grid for supplying a mains voltage and a mains current,
   at least one electric line for the connection between said means for connection to the electricity grid and said electric furnace, and
   a power supply system able to power said electric furnace with alternating current and connected between said electricity grid and said electric furnace, wherein said power supply system comprises a plurality of power supply modules connected in parallel to each other, to the electricity grid, and to the electric furnace, each of the power supply modules comprising a first part configured to transform the electrical energy in alternating current supplied by the electricity grid into electrical energy in direct current, the first part comprising at least one transformer provided with at least one transformer primary connected to at least one transformer secondary, and at least one rectifier connected to the transformer secondary, and a second part configured to transform the electrical energy in direct current into electrical energy in alternating current, the second part comprising at least one converter connected to said at least one rectifier, wherein said first part and said second part of each power supply module are physically distanced from each other and connected to each other by an intermediate circuit in direct current connected between said at least one rectifier and said at least one converter, said intermediate circuit comprising one or more segments of line made with a superconductor cable, and wherein said electricity grid is of the three-phase type and each of the power supply modules is provided with a transformer secondary, a rectifier and a converter for each phase of said electricity grid; and further wherein each power supply module comprises an inductor connected to said at least one converter and located upstream of the electric furnace, said converter and said electric furnace being connected by one or several segments of line passing through said inductor and made with at least one superconductor cable.

2. The electric power supply apparatus as in claim 1, wherein the distance between said first part and said second part is between a few tens and a few hundred meters.

3. The electric power supply apparatus as in claim 1, wherein said rectifiers and said converters of said power supply system share the same intermediate circuit in direct current made with at least one superconductor cable.

4. The electric power supply apparatus as in claim 1, wherein at least the first part of each power supply module is positioned inside a first building and at least the second part of each power supply module is positioned inside a second building, said parts of each power supply module being connected by said one or more segments of line made with at least one superconductor cable.

5. The electric power supply apparatus as in claim 4, wherein said first part positioned in the first building comprises the transformers and the rectifiers of each power supply module, while said second part positioned in the second building comprises the converters and the segments of line which carry the current from said converters to the electric furnace.

6. The electric power supply apparatus as in claim 1, wherein said superconductor cables comprise a coaxial coating made with a simple or corrugated pipe into which there is introduced a refrigerant fluid.

7. The electric power supply apparatus as in claim 6, wherein the refrigerant fluid is nitrogen or helium.

8. The electric power supply apparatus as in claim 1, wherein said superconductor cables are at least partly made of Magnesium Diboride.

9. The electric power supply apparatus as in claim 1, wherein the electric line comprises at least a first high voltage/medium voltage transformer located downstream of the means for connection to the electricity grid and connected to the transformers of the power supply system and the power supply system is connected to the transformer and/or to the electric arc furnace by at least one segment of line made with at least one superconductor cable.

10. An electric power supply apparatus for an electric furnace for steel industry applications, comprising:

means for connection to an electricity grid for supplying a mains voltage and a mains current, at least one electric line for the connection between said means for connection to the electricity grid and said electric furnace, and a power supply system able to power said electric furnace with alternating current and connected between said electricity grid and said electric furnace, wherein said power supply system comprises a plurality of power supply modules connected in parallel to each other, to the electricity grid, and to the electric furnace, each of the power supply modules comprising a first part configured to transform the electrical energy in alternating current supplied by the electricity grid into electrical energy in direct current, the first part comprising at least one transformer provided with at least one transformer primary connected to at least one transformer secondary, and at least one rectifier connected to the transformer secondary, and a second part configured to transform the electrical energy in direct current into electrical energy in alternating current, the second part comprising at least one converter connected to said at least one rectifier, wherein said first part and said second part of each power supply module are physically distanced from each other and connected to each other by an intermediate circuit in direct current connected between said at least one rectifier and said at least one converter, said intermediate circuit comprising one or more segments of line made with a superconductor cable, and wherein said electricity grid is of the three-phase type and each of the power supply modules is provided with a transformer secondary, a rectifier and a converter for each phase of said electricity grid; and wherein the at least one transformer is a medium voltage/medium voltage transformer and said electric apparatus comprises at least one high voltage/medium voltage transformer located downstream of said electricity grid and upstream of said medium voltage/medium voltage transformer, wherein said medium voltage/medium voltage transformer and said high voltage/medium voltage transformer are connected by a segment of line made with at least one superconductor cable.

11. The electric power supply apparatus as in claim 10, wherein at least the first part of each power supply module is positioned inside a first building and at least the second part of each power supply module is positioned inside a second building, said parts of each power supply module being connected by said one or more segments of line made with at least one superconductor cable.

12. The electric power supply apparatus as in claim 11, wherein said first part positioned in the first building comprises the transformers and the rectifiers of each power supply module, while said second part positioned in the second building comprises the converters and the segments of line which carry the current from said converters to the electric furnace.

13. The electric power supply apparatus as in claim 10, wherein said superconductor cables comprise a coaxial coating made with a simple or corrugated pipe into which there is introduced a refrigerant fluid.

14. An electric power supply apparatus for an electric furnace for steel industry applications, comprising:

means for connection to an electricity grid for supplying a mains voltage and a mains current, at least one electric line for the connection between said means for connection to the electricity grid and said electric furnace, and a power supply system able to power said electric furnace with alternating current and connected between said electricity grid and said electric furnace, wherein said power supply system comprises a plurality of power supply modules connected in parallel to each other, to the electricity grid, and to the electric furnace, each of the power supply modules comprising a first part configured to transform the electrical energy in alternating current supplied by the electricity grid into electrical energy in direct current, the first part comprising at least one transformer provided with at least one transformer primary connected to at least one transformer secondary, and at least one rectifier connected to the transformer secondary, and a second part configured to transform the electrical energy in direct current into electrical energy in alternating current, the second part comprising at least one converter connected to said at least one rectifier, wherein said first part and said second part of each power supply module are physically distanced from each other and connected to each other by an intermediate circuit in direct current connected between said at least one rectifier and said at least one converter, said intermediate circuit comprising one or more segments of line made with a superconductor cable, and wherein said electricity grid is of the three-phase type and each of the power supply modules is provided with a transformer secondary, a rectifier and a converter for each phase of said electricity grid;

wherein at least the first part of each power supply module is positioned inside a first building and at least the second part of each power supply module is positioned inside a second building, said parts of each power supply module being connected by said one or more segments of line made with at least one superconductor cable;

wherein said first part positioned in the first building comprises the transformers and the rectifiers of each power supply module, while said second part positioned in the second building comprises the converters and the segments of line which carry the current from said converters to the electric furnace; and further wherein the second part of each power supply module further comprises inductors positioned in the second building.

15. The electric power supply apparatus as in claim 14, wherein said superconductor cables comprise a coaxial coating made with a simple or corrugated pipe into which there is introduced a refrigerant fluid.

16. The electric power supply apparatus as in claim 14, wherein said superconductor cables are at least partly made of Magnesium Diboride.

* * * * *